June 14, 1960 — R. S. CARTER — 2,940,218

NUTRIENT FLUID CONTROL IN HYDROPONIC SYSTEMS

Filed Feb. 11, 1957 — 2 Sheets-Sheet 1

RICHARD S. CARTER
INVENTOR.

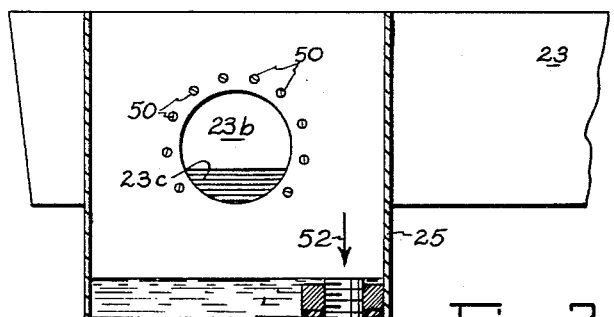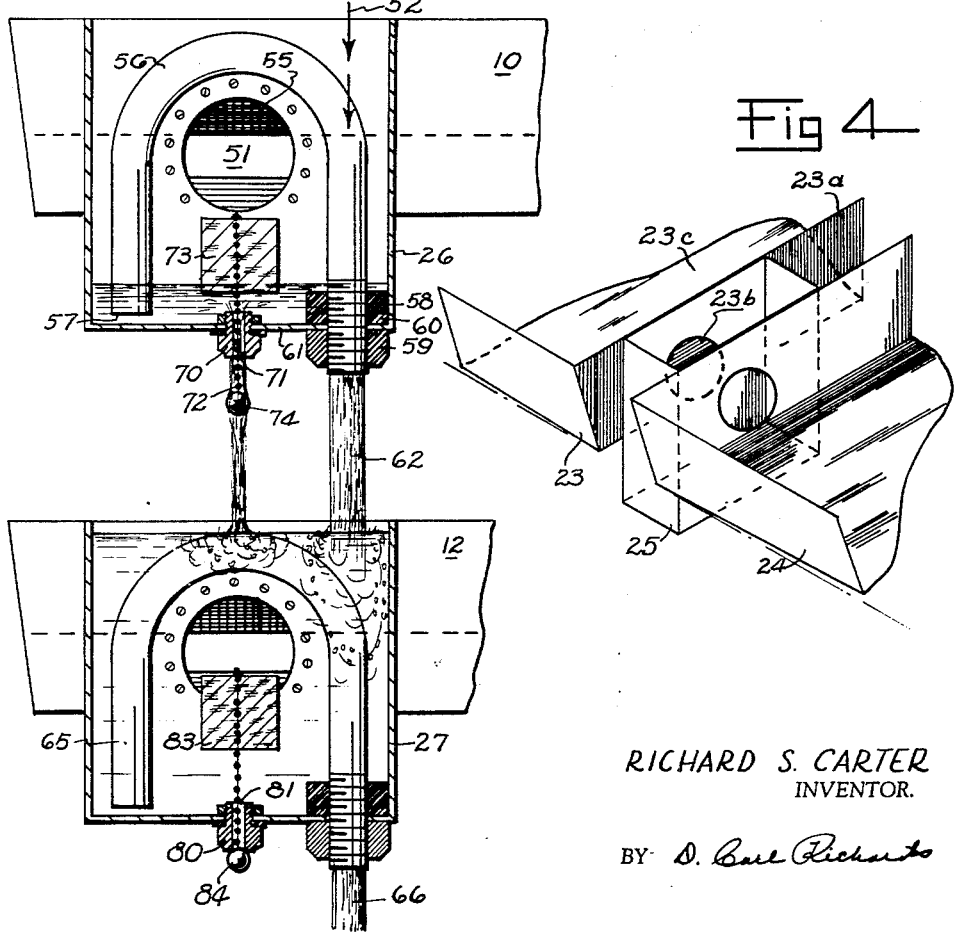

United States Patent Office 2,940,218
Patented June 14, 1960

2,940,218

NUTRIENT FLUID CONTROL IN HYDROPONIC SYSTEMS

Richard S. Carter, Dallas, Tex., assignor, by mesne assignments, to Hydroponics, Incorporated, Indianapolis, Ind., a corporation of Indiana Filed Feb. 11, 1957, Ser. No. 639,457

4 Claims. (Cl. 47—1.2)

This invention relates to hydroponic cultivation of plants wherein germination and growth are stimulated under controlled soilless nutrition and environment, and more particularly to a system for periodically flowing a nutrient laden fluid through a culture system.

There have been developed several systems for promoting soilless cultivation of plants which, in general, are characterized by disposal of a bed of seeds in a zone through which a liquid periodically is caused to flow while carrying in solution the necessary plant nutrients. Several factors have dictated the desirability of an arrangement in which culture trays are stacked in tiers, one above another as to permit unit operation. In such a unit a common nutrient stream is caused to flow successively from a top culture tray to lower culture tray before discharge thereof.

It has been found to be important that the nutrient liquid remain in contact with a given seed bed for a predetermined time interval and that thereafter complete drainage be accomplished.

Manual operation of valves located in the liquid flow path between each level of a multi-stage unit has been employed but has been found undesirable because of the constant attention required of an operator during a feed or irrigation period. Various systems have been devised to provide automatic transfer of fluid from one level to another but simplicity providing proper drainage has been a problem not readily amenable to solution.

In accordance with the present invention a new and wholly satisfactory nutrient flow system has been provided wherein transfer of nutrient fluid between each of successive stages in a given amount is characterized by fluid actuated closure of a leak valve to prevent loss of nutrient fluid during the interval required to flow sufficient fluid into a zone to raise the level therein to a siphoning level, and at the same time to provide for certain and trouble free drainage for flushing that zone beyond the capability of a siphon system.

More particularly in accordance with the present invention irrigation of a tiered hydroponic culture system is accomplished by periodically establishing a nutrient bearing fluid flow into a culture zone at a first rate to inundate a seed bed therein and then at the instant the fluid in said zone exceeds a predetermined level exceeding that necessary to cover said seed bed flow of fluid from said bed is established at a comparable rate. Flow into said zone is then terminated and in response to fluid level below the seed bed, a continuous drainage flow is initiated which is lower than the above noted rates to permit long period flushing of the culture zone.

In a more specific aspect there is provided a combination of elements intermediate each of a plurality of culture zones including a means for establishing fluid flow into a given culture zone and siphon means for draining said zone only after fluid level therein reaches a siphoning level.

Thereafter a second flow port is opened in response to the lowering of fluid level in said zone below a predetermined level to provide continuous drainage. Preferably a float actuated element extends through a flow port to scour the port upon movement thereof and to effect closure of the port.

For further objects and advantages of the invention and for a more complete understanding thereof reference may now be had to the following descriptions taken in conjunction with the accompanying drawings in which:

Fig. 3 is an enlarged section taken along lines 3—3 of Fig. 1; and

Fig. 4 is an isometric view showing the relation of a drain well and a pair of associated traps.

Figure 1:
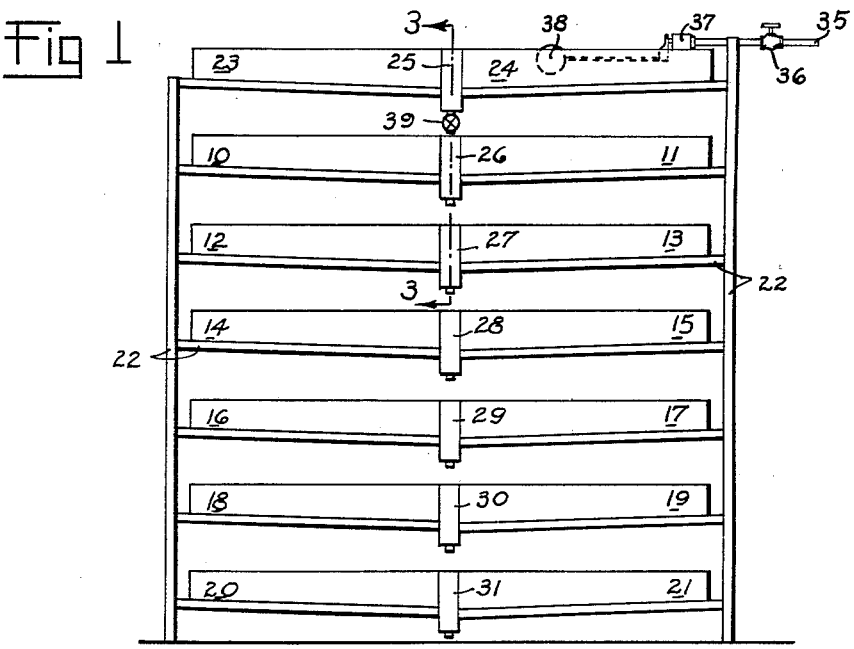
Fig. 1 is a front view of a system embodying the present invention.

Referring now to Fig. 1 there is illustrated a hydroponic culture system in which twelve culture trays 10–21 are disposed in tiers and supported on a frame 22. Two additional trays 23 and 24, are provided to form water reservoirs and are positioned on top of the frame 22 above the culture trays 10–21.

Each of the trays preferably has a bottom surface sloping downward toward the center of the frame 22. A drain well or siphon box is provided intermediate each pair of trays. More particularly box 25 is located between trays 23 and 24. A second box 26 is located immediately below box 25 and intermediate trays 10 and 11. Similarly boxes 27–31 are located in tiers respectively intermediate the successively lower pairs of trays 12–21.

Fluid inlet pipe 35 connected to a suitable water supply is connected through manual valve 36 and valve 37 actuated by float 38 to a faucet leading to the water reservoirs formed by the upper pair of trays 23 and 24. A manual valve 39 is provided at the bottom of box or well 25. As will hereinafter be shown the drain wells such as well 25 provide a fluid coupling between adjacent trays 23 and 24.

Figure 2:
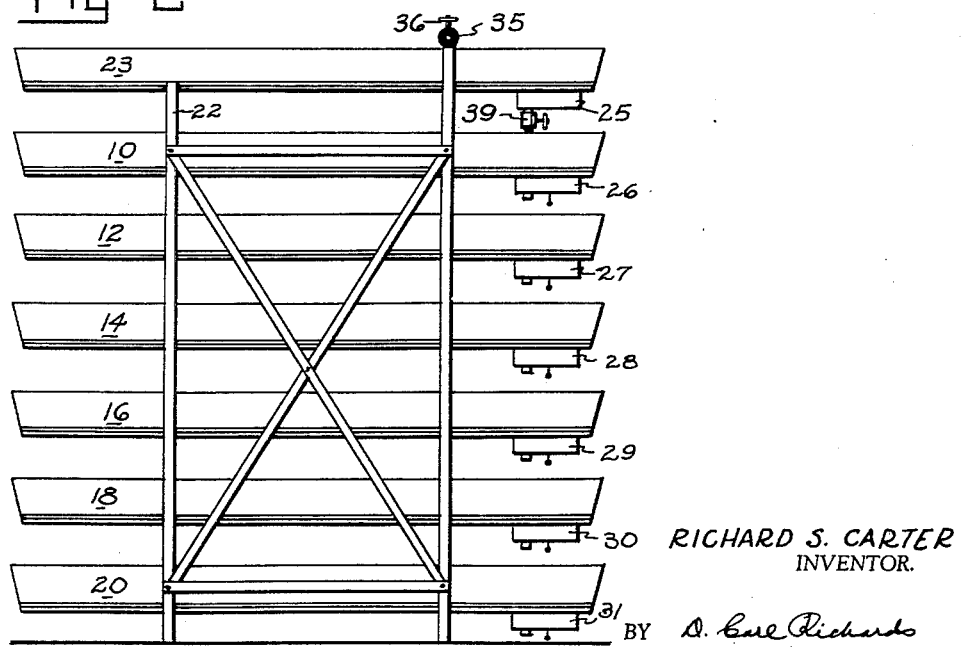
Fig. 2 is a side view of said system.

Referring to Fig. 2 it will be seen that each individual tray such as trays 23 and 24 are rectangular in shape and rest upon partition members provided in frame 22. In one embodiment each tray was of the order of 7 feet lone, 3 feet wide, and about 5 inches deep. The trays were arrayed in tiers spaced about 13 inches on centers, thereby providing suitable space for plant growth above each culture tray.

In practice, seed baskets are loaded with seeds, such as oats, which have been prepared by soaking them in water for about six hours and then permitting them to drain and germinate for 24 hours. Loaded seed baskets are placed in the trays 10–21 and subjected to a program of irrigation with nutrient laden water, preferably under temperatures maintained between 60 and 80° F. The beds of seeds in seed baskets are spaced from the bottom of the associated culture trays about 1 to 2 inches more or less to permit root development.

With valve 39 closed and valve 36 open water reservoirs 23 and 24 will be filled to the level permitted by float 38 which controls valve 37. In the system above described 80 gallons of water are used. A suitable nutrient chemical is then added to the water in reservoirs 23 and 24. An irrigation operation is then initiated by opening valve 39 and closing valve 36. The feed water is then transferred to well 26 and trays 10 and 11. After remaining in trays 10 and 11 for a predetermined interval, the feed water is transferred, through operations hereinafter described, to well 27 and trays 12 and 13 and then successively through the entire culture system. One aspect of the present invention is particularly directed to the flow and transfer of feed water from one culture tray to another. In a more specific aspect there is provided a transfer system which, after fluid reaches a predetermined level in a zone, rapidly drains that culture tray or zone and then provides a continuous and self-cleaning channel for fluids which slowly flow out of a seed bed after abrupt reduction of the fluid level therein to below the elevation of the seed bed. More particularly, and as shown in Fig. 3 there is illustrated a combination of a siphon in a drain well and a float operated leak valve which coact with each pair of culture trays to cause feed fluids to reach a predetermined level and thereafter drain in two stages, the first stage being at a rapid rate and the second or prolonged stage at a slow rate.

Referring to Fig. 3 a portion of a culture system has been illustrated, including reservoir 23 and culture trays 10 and 12, at the instant in an irrigation cycle in which flow of the primary charge of nutrient fluid from tray 10 and its associated well or siphon box 26 is about to terminate and flow from tray 12 and its associated siphon box 27 is maximum.

More particularly referring to Fig. 3 and isometric Fig. 4 the side of reservoir 23a is provided with a large port 23b which is tangent at the bottom thereof with the bottom of tray 23. As seen through port 23b, Fig. 3, the bottom 23c of tray 23 slopes toward port 23b to provide drainage into box 25 which is provided with a port in the side thereof corresponding with port 23b. As shown in Fig. 4, a unitary structure is formed consisting of trays 23 and 24 and box 25. Screws 50, Fig. 3, may conveniently be employed to couple tray 23 to box 25, the gasket, of course, having a hole therein corresponding with port 23b.

Tray 10 and box 26 are similarly coupled, as are tray 12 and box 27, and the remaining trays and boxes.

Box or drain well 25 is suitably connected to valve 39 which, when open, permits reservoir 23 to drain into siphon box 26 and thence through port 51 into culture tray 10. The flow path has been indicated by arrows 52. As seen through port 51, the bottom 10c of tray 10 slopes toward port 51. Also, a portion of a seed basket 55 is seen through port 51.

Siphon box is provided with a curved pipe forming a siphon, the short leg or branch of which terminates at point 57 inside siphon box 26 near the bottom thereof. The long leg of siphon 56 is sealed by nuts 58 and 59 and gasket 60 to the bottom 61 of box 26 and terminates below box 26 and directly above box 57. A stream of fluid 62 is shown flowing through siphon 56 into box 27. Box 27 similarly is provided with a siphon 65 through which a stream 66 is flowing.

It will be understood that siphons 56 and 65 will not begin transfer until after a seed bed has been completely covered by nutrient fluid. Once transfer is initiated, it will continue until the fluid level in a siphon box is lowered to the mouth of the short branch of the siphon at point 57 in box 26. At the latter point, siphoning ceases. However, a thoroughly soaked seed or culture mat in basket 55 will continue to drain and the control of this secondary charge of nutrient fluid has heretofore been found difficult. Small drain or leak openings have, in the past, been provided in the siphon box but have been found to become stopped by accumulation of solids carried by the fluid.

A ready and reliable system for solving this problem is provided with a small port or leak valve in the bottom thereof which has a fitting 70. A channel 71 extends through fitting 70 and preferably is formed with a spherical seat at the bottom thereof. A link such as a ball chain 72 is supported at the upper end thereof by a float such as cork 73. The lower end of chain 72 carries a ball adapted to fit the seat in the lower end of fitting 70.

In operation, during drainage periods, the low fluid level in box 26 permits flow through channel 71. During irrigation periods as shown in siphon box 27, the elevated fluid level raises cork 83 to close channel 81 as ball 84 seats in the lower end of fitting 80.

Thus there is provided means for automatic control of a drain port. At the same time movement of the chains such as chain 72, through its drain channel, serves to scour the channel and maintain it free for repeated irrigation cycles. This permits automatic transfer of fluids successively from one culture zone, first at a rapid flow rate and thereafter, in response to lowered fluid levels in a given siphon box, at a second and much lower rate for continuous drainage of said bed.

In practice it will be found preferable to house the unit shown in Figs. 1 and 2 in a suitable enclosure to permit the desired temperature control.

While specific embodiments of the invention have been illustrated and described, it will be understood that after modifications may now appear to those skilled in the art, and it is intended to cover such modifications as fall within the scope of the appended claims.

What is claimed is:

1. In a hydroponic culture system the combination of means for transferring fluid from a given culture zone comprising a drainage well, a siphon having the short branch terminating below the level of said zone and in said well and the long branch terminating outside and below said well, and a float actuated valve leading from said well adapted to be closed in response to elevated fluid levels in said well.

2. Flow control means for a hydroponic culture system disposed in a stacked array comprising a first tray arranged freely to drain to a selected point below the level of said first tray, two flow channels leading from said first tray to a second lower tray, said first channel comprising a siphon, said second channel comprising an orifice having an inlet at said point, a float anchored through said orifice to a member adapted to close said orifice when fluid in said first tray approach a siphoning level.

3. In a hydroponic culture system the combination of a tray, a drainage zone lower than said tray and connected for fluid free flow therebetween, a siphon having the short branch terminating below said tray in said zone and the long branch terminating below and outside said zone with the crest thereof near the top of said tray, a second fluid path leading from said zone, a float in said zone, closure means for said path, and coupling means extending through said second path between said float and said closure means of length substantially less than the length of said short branch.

4. In a hydroponic culture system the combination of a culture tray, a drain box with the bottom thereof lower than said tray and flow connected thereto, a siphon extending below said box whose inlet is adjacent the bottom of said box and whose crest is near the top of said tray, means forming an orifice in the bottom of said box, a float in said box, a ball outside said box, and a means of length effectively less than the height of said siphon extending through said orifice and interconnecting said float and said ball.

References Cited in the file of this patent
UNITED STATES PATENTS

| 2,716,422 | Whitlock | Aug. 30, 1955 |

FOREIGN PATENTS

| 639,901 | France | Mar. 19, 1928 |
| 857,501 | France | Apr. 15, 1940 |
| 1,070,140 | France | Feb. 17, 1954 |
| 206,810 | Germany | Feb. 11, 1909 |
| 212,909 | Great Britain | Apr. 9, 1925 |
| 41,867 | Netherlands | Oct. 15, 1937 |
| 110,105 | Switzerland | June 1, 1925 |